United States Patent
Sjöberg et al.

(10) Patent No.: US 7,537,419 B2
(45) Date of Patent: May 26, 2009

(54) CUTTING TOOL, WITH SERRATED CONNECTING SURFACES ON THE INSERT AND INSERT SEAT

(75) Inventors: Tomas Sjöberg, Sandviken (SE); Gunnar Jansson, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 10/581,080

(22) PCT Filed: Feb. 8, 2005

(86) PCT No.: PCT/SE2005/000163

§ 371 (c)(1),
(2), (4) Date: Apr. 16, 2007

(87) PCT Pub. No.: WO2005/077574

PCT Pub. Date: Aug. 25, 2005

(65) Prior Publication Data

US 2007/0292220 A1 Dec. 20, 2007

(30) Foreign Application Priority Data

Feb. 11, 2004 (SE) .................................. 0400273

(51) Int. Cl.
B23B 27/16 (2006.01)
(52) U.S. Cl. ........................... 407/103; 407/113; 407/66
(58) Field of Classification Search .................... 407/47, 407/48, 66, 101–103, 113
See application file for complete search history.

(56) References Cited

U.S. PATENT DOCUMENTS

| 1,629,667 | A | * | 5/1927 | Knipple ........................ 407/103 |
| 4,693,641 | A | * | 9/1987 | Tsujimura et al. ............. 407/42 |
| 5,542,795 | A | * | 8/1996 | Mitchell ........................ 407/35 |
| 5,810,518 | A | * | 9/1998 | Wiman et al. ................ 407/102 |
| 5,924,826 | A |   | 7/1999 | Byström et al. |
| 5,931,613 | A |   | 8/1999 | Larsson |
| 6,024,519 | A | * | 2/2000 | Okui et al. ................... 407/113 |
| 6,102,630 | A | * | 8/2000 | Flolo ............................ 407/42 |

(Continued)

FOREIGN PATENT DOCUMENTS

DE             3446455 A1 *  6/1986

(Continued)

*Primary Examiner*—Boyer D Ashley
*Assistant Examiner*—Sara Addisu
(74) *Attorney, Agent, or Firm*—Drinker Biddle & Reath LLP

(57) ABSTRACT

In a first aspect, the invention relates to a cutting tool that comprises a part (1) having an insert seat as well as a cutting insert (2) detachably connected in the same, which insert comprises a first serration connecting surface (3), which is formed of ridges spaced-apart by grooves, which ridges are arranged to engage grooves situated between ridges in a second serration connecting surface (4) serving as insert seat in said tool part (1). According to the invention, in one (3) of said serration connecting surfaces (3, 4), at least one enlarged ridge (18) is arranged between two spaced-apart fields (20*a*, 20*b*), which separately comprises a plurality of ordinary ridges of a certain size, which enlarged ridge is arranged to engage a correspondingly enlarged groove (19) in the second serration connecting surface (4). In additional aspects, the invention also relates to a cutting insert and a tool part as such.

21 Claims, 3 Drawing Sheets

U.S. PATENT DOCUMENTS

Figure 1:
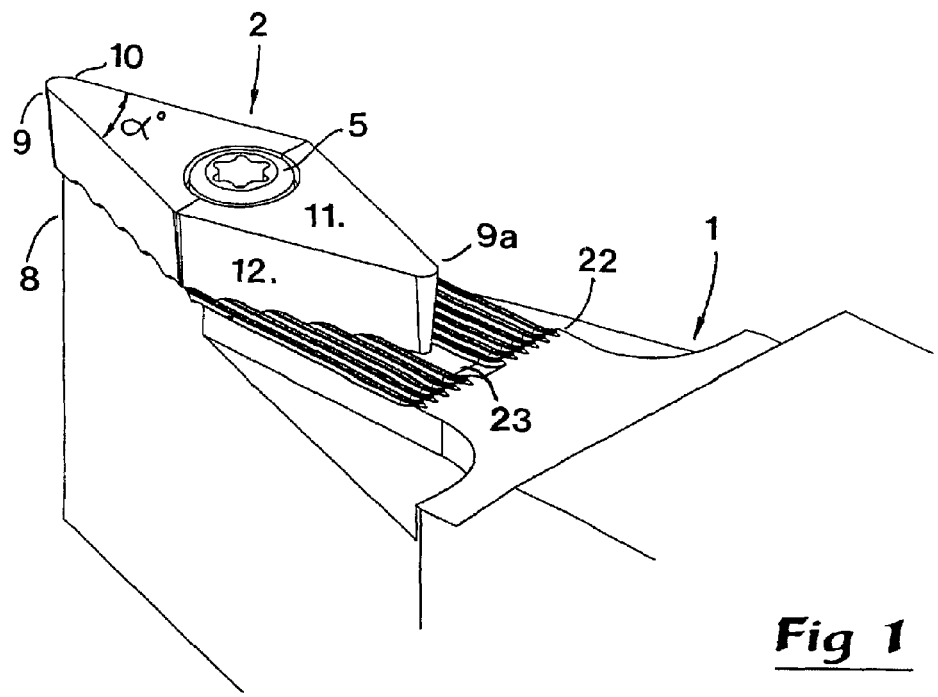

| | | | | |
|---|---|---|---|---|
| 6,146,060 | A * | 11/2000 | Rydberg et al. | 407/40 |
| 6,146,061 | A * | 11/2000 | Larsson | 407/103 |
| 6,152,658 | A * | 11/2000 | Satran et al. | 407/103 |
| 6,626,614 | B2 * | 9/2003 | Nakamura | 408/59 |
| 6,931,613 | B2 * | 8/2005 | Kauth et al. | 716/5 |
| 6,960,049 | B2 * | 11/2005 | Inayama | 407/103 |
| 7,001,114 | B2 * | 2/2006 | Blucher et al. | 407/103 |
| 7,021,871 | B2 * | 4/2006 | Arvidsson et al. | 407/113 |
| 7,101,122 | B2 * | 9/2006 | Horiike et al. | 407/113 |
| 7,217,080 | B2 * | 5/2007 | Hendron | 414/694 |
| 7,234,907 | B1 * | 6/2007 | Artrip | 413/66 |
| 2003/0219320 | A1 * | 11/2003 | Horiike et al. | 407/113 |
| 2004/0071515 | A1 * | 4/2004 | Arvidsson et al. | 407/113 |

FOREIGN PATENT DOCUMENTS

| | | | |
|---|---|---|---|
| EP | 1375037 A1 * | 1/2004 | |
| JP | 2002200504 A * | 7/2002 | |
| SU | 462662 A * | 6/1975 | |
| WO | 97/11806 | 4/1997 | |
| WO | 02/055243 | 7/2002 | |
| WO | 02/055245 | 7/2002 | |
| WO | WO 2005080036 A1 * | 9/2005 | |

* cited by examiner

CUTTING TOOL, WITH SERRATED CONNECTING SURFACES ON THE INSERT AND INSERT SEAT

TECHNICAL FIELD OF THE INVENTION

In a first aspect, this invention relates to a cutting tool of the type that comprises a part having an insert seat as well as a cutting insert detachably connected in the same, which insert comprises a first serration connecting surface, which is formed of ridges spaced-apart by grooves, which ridges are arranged to engage grooves existing between ridges in a second serration connecting surface serving as insert seat in said tool part.

PRIOR ART

Tools of the above-mentioned type, which are intended for chip-removing machining of foremost workpieces of metal, are usually composed of a carrying or holding basic body, e.g., a boring bar, a cutter head, a drill shank or the like, as well as one or more replaceable cutting inserts, which each are mounted in a, so-called, insert seat. Most commonly, the same insert seat is formed in the basic body itself, but in certain cases, the same may also be formed in a particular shim plate, which in turn is fixed in relation to the basic body. The cutting inserts may have a most varying shape and be indexable in order to enable use of two or more cutting edges included in the cutting insert. While the cutting inserts are manufactured from a particularly hard and wear-resistant material, such as moulded and sintered cemented carbide, the basic body is manufactured from a more elastic material, in particular steel.

In serration connecting surfaces of the kind in question, the number of ridges in the individual surface may vary most considerably depending on the size and field of application of the cutting inserts, but amounts, however, usually to at least 6 or more. Also the size of the ridges, such as is determined by the height, as well as the width or the pitch between nearby ridges, varies between different cutting inserts. However, generally, the rule applies that the connecting surface on large cutting inserts is formed with comparatively coarse or wide ridges (=wide pitch), while the ridges in connecting surfaces on smaller cutting inserts having an equivalent number of ridges are considerably thinner (=close pitch). While the pitch, i.e., the distance between nearby ridge tops or crests, of connecting surfaces on large cutting inserts may amount to 1-3 mm, the ridge pitch in smaller cutting inserts, e.g., rhombic turning inserts, is most often less than 1 mm (0.3-1 mm). Characteristic of previously known serration connecting surfaces of the type that is based on the use of a plurality of ridges in the respective surface, is further that all ridges are uniform, i.e., they have equally great height and the same mutual pitch. It should also be mentioned that the cross-section shape of the ridges is generally wedge-shapedly tapering, so that two opposite flank surfaces extend at an acute angle (usually 60°) to each other, and that the height of the ridges in relation to the depth of the grooves is such that the crests of the ridges do not bottom in the appurtenant grooves.

In particular, in small cutting inserts having a close pitch between the ridges, as a consequence of the fact that the ridges are small and therefore difficult to perceive by the eye, problems may arise in connection with the mounting of the cutting insert in an appurtenant insert seat. Thus, it happens every now and then that the cutting insert unintentionally is located at the side of the intended position thereof in relation to the insert seat. In cutting inserts having such close ridge pitch as, for instance, 0.5 mm, the cutting insert may by mistake easily be placed 0.5 mm laterally displaced in relation to the desired position, after which it even is possible to tighten the tightening screw or the clamp that has the purpose of fixing the cutting insert in the insert seat, without the erroneous location being discovered. The consequences of even during a short time machining a workpiece with a cutting tool, the cutting insert of which is misplaced, may many times become devastating.

OBJECTS AND FEATURES OF THE INVENTION

The present invention aims—in a first aspect—at obviating the above-mentioned disadvantage of previously known tools and at providing an improved cutting tool. Therefore, a primary object of the invention is to provide a cutting tool operating with serration connections between the cutting insert and the insert seat, the cutting insert of which can be placed with great certainty in the correct, desired position in the insert seat. More precisely, the cutting insert should be possible to place correctly in a "foolproof" way, without the operator needing to consider this task. It is also an object to provide a cutting tool, the serration connection of which has improved ability to transfer forces between the cutting insert and the appurtenant basic body or tool part.

According to the invention, at least the primary object is attained by the features defined in that in one of the serration connecting surfaces, at least one enlarged ridge is arranged between two spaced-apart fields, which separately comprises a plurality of ordinary ridges of a certain size, which enlarged ridge is arranged to engage a correspondingly enlarged groove in the second serration connecting surface, and in that the extension of the enlarged ridge is parallel with the ordinary ridges.

In an additional aspect, the invention also aims at providing an improved cutting insert for cutting tools. An altogether special object is to provide a rhombic cutting insert, in particular a rhombic turning insert, which not only is simple to place in the correct position in the insert seat, but also is reinforced and less prone to be damaged than previously known rhombic cutting inserts.

The features of the cutting insert according to the invention in a basic design include, in the serration connecting surface, at least one enlarged ridge and/or an enlarged groove arranged between two spaced-apart fields, which separately comprises a plurality of ordinary ridges of a certain size, and in that the extension of the at least one enlarged ridge and/or an enlarged groove is/are parallel with the ordinary ridges.

In a third aspect, the invention also aims at providing an improved tool part or basic body for cutting tools. The features of this tool part include, in the serration connecting surface, at least one enlarged ridge and/or an enlarged groove arranged between two spaced-apart fields, which separately comprises a plurality of ordinary ridges of a certain size, and in that the extension of the at least one enlarged ridge and/or an enlarged groove is/are parallel with the ordinary ridges.

SUMMARY OF THE INVENTION

The invention is based on the idea to form, in the individual serration connecting surface of a serration connection, at least one enlarged, suitably central ridge between two spaced-apart fields, which separately comprises a plurality of ordinary ridges of a certain uniform size. In such a way, it is guaranteed that the cutting insert only can be mounted in one way, i.e., in a given, desired position, by that the enlarged ridge only can be brought to engagement with a correspondingly enlarged groove in the second connecting surface.

ADDITIONAL ELUCIDATION OF PRIOR ART

By WO 9711806 A1, a cutting tool is previously known having a serration connection between the cutting insert and the insert seat, the cutting insert comprising a plurality of fields or sets of ridges and grooves. However, in this case, the co-operating serration connecting surfaces lacks any enlarged ridge and groove, respectively, having some position-determining function, since all ridges in the different ridge fields are equally large.

BRIEF DESCRIPTION OF THE APPENDED DRAWINGS

Figure 2:
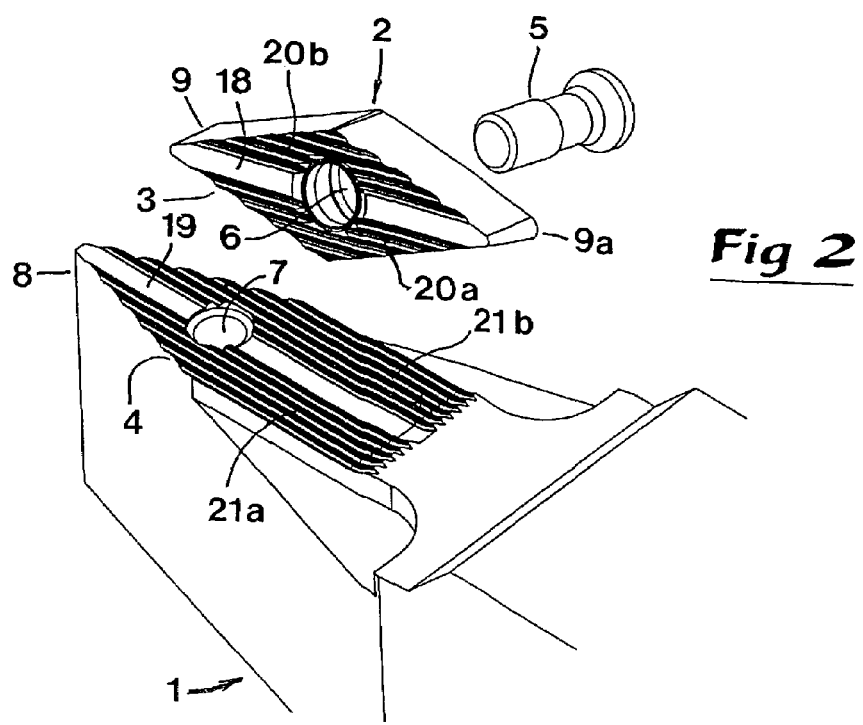
Figure 3:
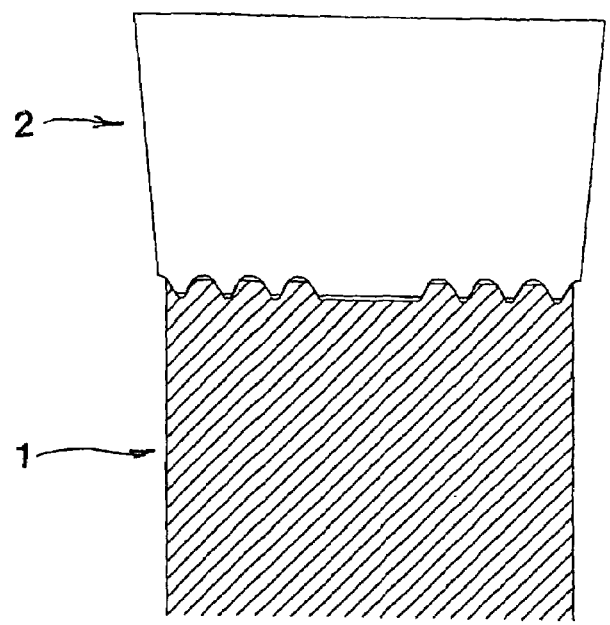
Figure 4:
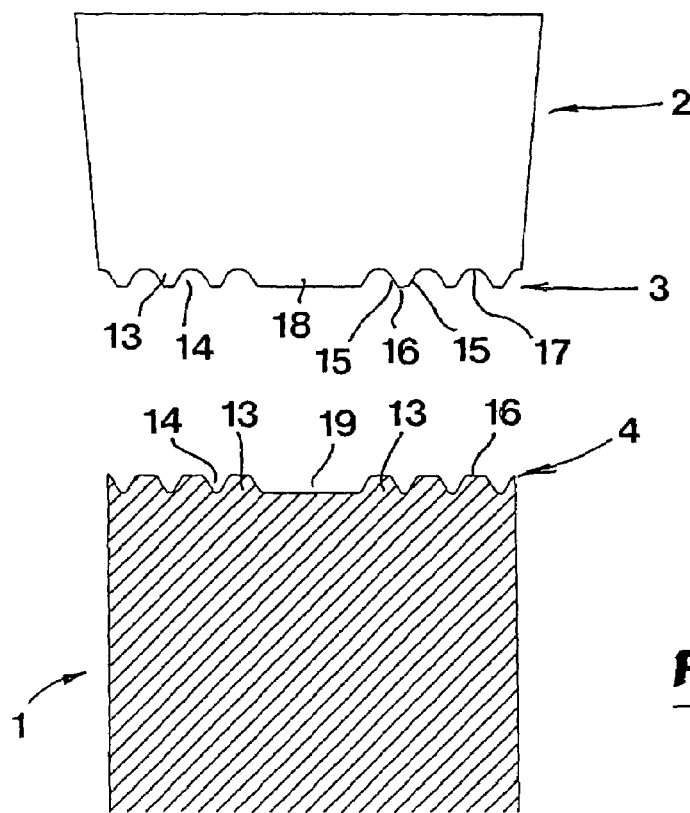
Figure 5:
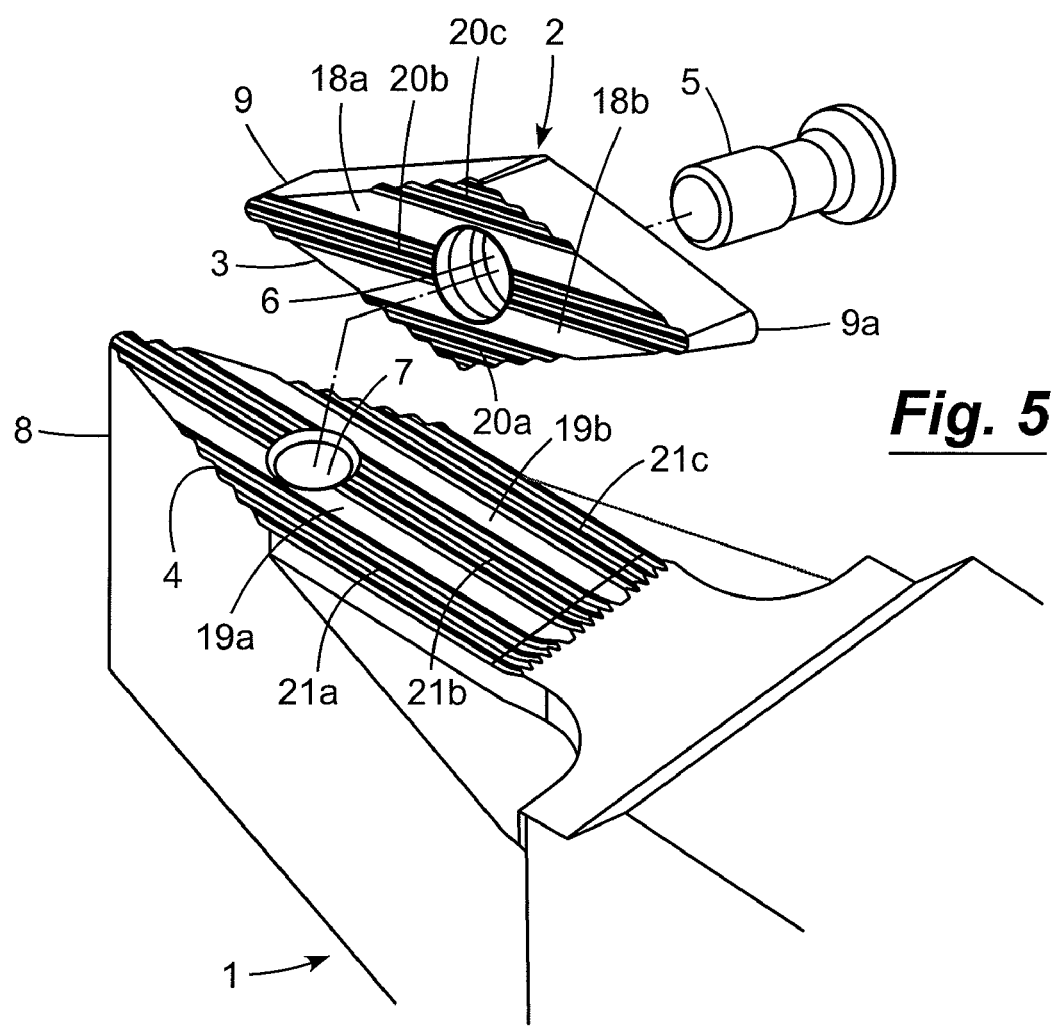

In the drawings:

FIG. 1 is a perspective view of a cutting tool in the form of a turning tool, of the type that comprises a basic body and a rhombic cutting insert, FIG. 2 is a perspective exploded view showing the cutting insert separated from the basic body, FIG. 3 is an enlarged section showing a serration connection between the cutting insert and the basic body, FIG. 4 is an analogous section showing the cutting insert separated from the basic body, and FIG. 5 is a perspective exploded view of an alternative embodiment of a cutting tool in the form of a turning tool, of the type that comprises a basic body and a rhombic cutting insert showing the cutting insert separated from the basic body.

DETAILED DESCRIPTION OF A PREFERRED EMBODIMENT OF THE INVENTION

The tool exemplified in FIGS. 1 and 2 is in the form of a turning tool of the type that is composed of a basic body or holder 1 and a cutting insert 2 detachably connected with the same. In the example, said turning insert 2 has a rhombic basic shape for the simple reason that the invention is particularly well applicable to rhombic turning inserts. However, already now it should be pointed out that the invention advantageously also may be applied, on one hand, to other tools than turning tools, and on the other hand to cutting inserts of another geometrical basic shape, e.g., square or rectangular.

Connection of the cutting insert with the basic body is realized by means of a serration connection, which comprises a first serration connecting surface 3 on the bottom side of the cutting insert 2, as well as a second serration connecting surface 4 on the basic body. The last-mentioned surface 4 forms a so-called insert seat for the cutting insert. In this case, fixation of the cutting insert in the insert seat is carried out by means of a tightening screw 5, which is brought through a central through hole 6 in the cutting insert, and is tightened in a threaded hole 7 in the insert seat.

It should also be mentioned that the nose angle α of conventional, rhombic turning inserts is within the range of 35-55°. The free, outer portion of the basic body 1 tapers at approximately the same angle α to an outer tip or end 8. The corresponding tips on the cutting insert 2 are designated 9 and 9a, respectively. The cutting insert is indexable in two positions. In the example, the tip 9 is shown assuming an active, forward-indexed position, while the tip 9a is inactive. The chip removal in a workpiece is carried out primarily by a rounded part of a cutting edge 10 adjacent to the tip 9 and 9a, respectively, which part is formed between the top side 11 of the cutting insert and side or clearance surfaces 12 connecting to these.

In FIG. 4 it is seen how the connecting surface 3 in the cutting insert 2 comprises a plurality of ridges 13, which are spaced apart by grooves 14. Each individual ridge 13 is delimited by two flank surfaces 15, which extend at an acute angle (e.g., 60°) to each other from a common top or crest 16. The individual groove 14 has a flute-like bottom 17.

In an analogous way, the serration connecting surface 4 serving as insert seat comprises a plurality of ridges 13 and grooves 14. Characteristic of conventional serration connecting surfaces is that the height and shape of the ridges 13 are so adapted in relation to the depth and shape of the grooves 14, that the crests 16 of the ridges do not bottom in, i.e., do not come into contact with the bottom of the grooves, as is seen in FIG. 3.

Such as the serration connection shown in the drawings has been described hitherto, the same is in all essentials previously known. Characteristic of previously known serration connecting surfaces is that all ridges and grooves in the respective surfaces are equally large, i.e., have one and the same uniform width or pitch, and have one and the same uniform depth, respectively.

Characteristic of the present invention is that in one of the two serration connecting surfaces, between two spaced-apart fields, which separately comprises a plurality of ordinary ridges of a certain size, at least one enlarged ridge is arranged, which is arranged to engage a correspondingly enlarged groove in the second serration connecting surface. The extension of the enlarged ridge and the enlarged groove is parallel with the extension of the ordinary ridges. In the shown, preferred embodiment, an enlarged ridge 18 is formed in the serration connecting surface 3 of the cutting insert 2, while a co-operating, enlarged groove 19 is formed in the serration connecting surface 4, which forms an insert seat in the basic body 1. The ridge 18 separates two fields, which are designated 20a and 20b, respectively, and which solely comprises ordinary ridges 13, of the type that is shown in FIGS. 3 and 4. In an analogous way, the groove 19 separates two fields 21a and 21b, respectively, which solely include ordinary ridges 13.

In the shown, preferred embodiment, the enlarged ridge 18 and the groove 19, respectively, are enlarged by being wider than the ordinary ridges and grooves in the fields 20a, 20b and 21a, 21b, respectively. Suitably, the width of the enlarged ridge/groove 18/19 is at least twice as large as the width of the ordinary ridges/grooves 13/14. In the concrete example according to the drawings, the width of the intermediate ridge 18 and the intermediate groove 19, respectively, is tripled, so far that the pitch between the two ridges 13 on both sides of the groove 19 is three times larger than the pitch between the ordinary ridges mutually.

In the example, the enlarged intermediate ridge 18 has the same height as the surrounding ordinary ridges 13, which means that the crests 16 of the ridges 13, 18 are located in a common plane. In an analogous way, the enlarged intermediate groove 19 has the same depth as the grooves 14 between the surrounding, ordinary ridges 13. In other words, the bottoms of the grooves 14, 19 are located in a common plane.

As is best seen in FIG. 2, the enlarged intermediate ridge 18 is centrally located in the serration connecting surface 3, which means that the two fields 20a, 20b of ordinary ridges are uniform and equally large. More precisely, said fields are triangular with the base of the triangle extending parallel with the intermediate ridge. Furthermore, it should be pointed out that the wide intermediate ridge 18 extends all the way between the two diametrically opposed tips 9, 9a of the cutting insert. This means that the tips on the cutting insert are reinforced because each one of the two opposite ends of the intermediate ridge adds additional material to the body that forms the cutting insert, in comparison with conventional cutting inserts having solely uniform, ordinary ridges between which grooves are present. Thanks to this reinforcement of the tips of the cutting insert, the risk of damage is reduced in those cases the active tip of the cutting insert is heavily loaded by the cutting forces.

Also the groove 19 is centrally located so far that the two fields 21*a*, 21*b* of ordinary ridges are equally wide (uniform). However, in this case, these fields are not genuinely triangular in the same way as the fields 20*a*, 20*b*, in that the rear portions of the ridges 13 extend to a common end line 22 perpendicular to the length extension of the ridges. The rear part of the groove 19, which extends from the hole 7 is longer than the part of the groove that extends from the hole and out to the tip 8. As is seen in FIG. 1, this means that the rear, inactive tip 9 of the cutting insert is located at a certain distance from the rear end 23 of the groove positioned in flush with the end line 22. The fixation of the cutting insert in the axial direction, i.e., parallel with the ridges and the grooves, is accordingly guaranteed solely by the screw 5, since the enlarged ridge (18) is parallel with the ordinary ridges (13).

The number of ordinary ridges/grooves in the fields 20*a*, 20*b* and 21*a*, 21*b*, respectively, may vary most considerably, but should amount to at least 3, preferably at least 5.

In an alternative embodiment of the present invention, a cutting tool differs from the preferred embodiment discussed previously, by including two enlarged ridges arranged in one serration connecting surface to engage two correspondingly enlarged grooves in the second serration connecting surface. In the alternative embodiment, shown in FIG. 5, two enlarged ridges 18*a* and 18*b* are formed in the serration connecting surface 3 of the cutting insert 2, while co-operating, enlarged grooves 19*a* and 19*b* are formed in the serration connecting surface 4, which forms an insert seat in the basic body 1. The enlarged ridges 18*a* and 18*b* separate three fields of ordinary ridges, which are designated 20*a*, 20*b*, and 20*c*, respectively. In an analogous way, the enlarged grooves 19*a* and 19*b* separate three fields of ordinary ridges, which are designated 21*a*, 21*b*, and 21*c*, respectively.

ADVANTAGES OF THE INVENTION

A substantial advantage of the invention is that the mounting of a cutting insert in an appurtenant insert seat in a tool part becomes "foolproof", so far that the cutting insert, thanks to the presence of at least one enlarged ridge and one enlarged groove co-operating therewith, guarantees that the cutting insert can be mounted in one way only, namely in one predetermined, desired position. Namely, if the cutting insert by accident or carelessness would be laterally displaced in relation to the insert seat, the two connecting surfaces will not fit together. Therefore, careless initial location of the cutting insert has to be corrected before tightening of the tightening screw or the tightening device can be carried out. Another advantage that is particularly salient in rhombic cutting inserts, in particular turning inserts, is that the tips of the cutting insert are radically reinforced by the extra addition of material in the two opposite end portions of the wide intermediate ridge. Furthermore, the wide intermediate ridge is considerably more robust and stronger than the ordinary ridges in the two side fields; something which in turn means that the intermediate ridge is not as prone to give way to lateral forces, as the thinner, ordinary ridges. In other words, the capacity of the serration connection to transfer forces between the cutting insert and the basic body is improved.

FEASIBLE MODIFICATIONS OF THE INVENTION

The invention is not only limited to the embodiment described above and shown in the drawings. Thus, the enlarged ridge or ridges may be enlarged in another way than just to be widened in comparison with the ordinary ridges in the surrounding fields. For instance, it is feasible to enlarge a ridge just by increasing the height of the same in relation to the height of the surrounding, ordinary ridges, at the same time as the corresponding groove in the co-operating serration connecting surface is made deeper than the grooves between the ordinary ridges in the same serration connecting surface. Enlargement of the ridge/groove may also be effected by a combination of, on one hand, an increase of the width and on the other hand an increase of the height and the depth, respectively. Furthermore, it is feasible to form the enlarged ridge in the serration connecting surface that forms an insert seat, while the correspondingly enlarged groove is formed in the cutting insert. However, for technical reasons concerning strength, the exemplified embodiment is preferred, i.e., with the enlarged ridge formed in the serration connecting surface of the cutting insert and the enlarged groove in the insert seat. It should also be pointed out that the two fields of ordinary ridges/grooves on both sides of an enlarged ridge/groove do not need to be uniform (have the same contour shape), such as has been described above. Furthermore, it is feasible to form the individual serration connecting surface with more than one enlarged ridge and groove, respectively, meaning that the surface in question may comprise three or more fields of ordinary ridges/grooves. Furthermore, it is axiomatic that the plurality of ordinary ridges, as well as the enlarged ridge or the few enlarged ridges, may have another cross-section shape than the one that is shown in the drawings. Finally, it should be mentioned that, in the individual serration connecting surface, it is feasible to form, on one hand, an enlarged ridge, which co-operates with a correspondingly enlarged groove in the other surface, and on the other hand an enlarged groove, which in turn co-operates with a ridge enlarged in an analogous way in the other surface.

LIST OF REFERENCE DESIGNATIONS

1=basic body
2=cutting insert
3=first serration connecting surface
4=second serration connecting surface (insert seat)
5=tightening screw
6=hole in cutting insert
7=threaded hole in basic body
8=tip portion on basic body
9=tip on cutting insert
10=cutting edge
11=top side of cutting insert
12=clearance surface on cutting insert
13=ridge
14=groove
15=flank surfaces
16=ridge crest
17=groove bottom
18=enlarged intermediate ridge
19=enlarged intermediate groove
20=surface fields of ordinary ridges
21=surface fields of ordinary ridges (insert seat)
22=end line
23=end of groove

The invention claimed is:

1. Cutting tool comprising a part having an insert seat as well as a cutting insert detachably connected in the same, which insert comprises a first serration connecting surface, which is formed of ridges spaced-apart by grooves, which ridges are arranged to engage grooves existing between ridges in a second serration connecting surface serving as insert seat in said tool part,
   wherein, in one of said serration connecting surfaces, at least one enlarged ridge is arranged between two spaced-apart fields,
   wherein the two spaced-apart fields each comprises a plurality of ridges of a second size, the second size being different than a size of the at least one enlarged ridge,
   wherein the enlarged ridge is arranged to engage a correspondingly enlarged groove in the other of said serration connecting surfaces,
   wherein the enlarged ridge is oriented parallel with the plurality of ridges in the two spaced-apart fields, wherein the first serration connecting surface is on a bottom side opposite a top side and adjacent a clearance surface of the cutting insert, and wherein the cutting edge of the cutting insert is the edge where the top side and clearance surface intersect.

2. Cutting tool according to claim 1, wherein the enlarged ridge is formed in the serration connecting surface of the cutting insert, while the enlarged groove is formed in the second connecting surface, which forms an insert seat.

3. Cutting tool according to claim 1, wherein the enlarged ridge and groove, respectively, are enlarged by being at least wider than the plurality of ridges and the grooves in said spaced-apart fields.

4. Cutting tool according to claim 3, wherein the width of the enlarged ridge/groove is at least twice as large as the width of the plurality of ridges/grooves in the two spaced-apart fields.

5. Cutting tool according to claim 1, wherein the enlarged ridge/groove is centrally located in the appurtenant serration connecting surface, so that the two fields with the plurality of ridges/grooves on both sides of the same are equally wide.

6. Cutting tool according to claim 1, wherein the number of the plurality of ridges/grooves in the individual field beside the enlarged ridge/groove amounts to at least 3.

7. Cutting tool according to claim 1, wherein the enlarged ridge/groove has the same height and depth, respectively, as the plurality of ridges/grooves, the crests of all ridges in the respective serration connecting surface being located in a common plane.

8. Cutting tool according to claim 1, wherein, in the one of said serration connecting surfaces having the at least one enlarged ridge, the plurality of ridges in at least one of the two spaced-apart fields are oriented parallel to each other and to the enlarged ridge.

9. Cutting tool according to claim 8, wherein, in the one of said serration connecting surfaces having the at least one enlarged ridge, the plurality of ridges in both of the two spaced-apart fields are oriented parallel to each other and to the enlarged ridge.

10. Cutting tool according to claim 1, including more than one enlarged ridge or more than one enlarged groove.

11. Cutting insert for cutting tools, comprising a serration connecting surface, which comprises a plurality of ridges spaced-apart by grooves,
   wherein, in the serration connecting surface, at least one of an enlarged ridge and an enlarged groove is arranged between two spaced-apart fields,
   wherein the two spaced-apart fields each comprises a plurality of ridges of a second size, the second size being different than a size of the at least one of the enlarged ridge and enlarged groove,
   wherein in the at least one of the enlarged ridge and enlarged groove is oriented parallel with the plurality of ridges in the two spaced-apart fields, wherein the first serration connecting surface is on a bottom side opposite a top side and adjacent a clearance surface of the cutting insert, and wherein the cutting edge of the cutting insert is the edge where the top side and clearance surface intersect.

12. Cutting insert according to claim 11, in the form of an indexable cutting insert of a rhombic basic shape, the nose angle ($\alpha$) of which at two diametrically opposed tips amounts to at most 55°, wherein the enlarged ridge extends between the two tips of the cutting insert and separates the two spaced-apart fields having the plurality of ridges.

13. Cutting insert according to claim 11, wherein the plurality of ridges in at least one of the two spaced-apart fields are oriented parallel to each other and to the at least one of the enlarged ridge and enlarged groove.

14. Cutting insert according to claim 13, wherein the plurality of ridges in both of the two spaced-apart fields are oriented parallel to each other and to the at least one of the enlarged ridge and enlarged groove.

15. Cutting insert according to claim 11, including more than one enlarged ridge or more than one enlarged groove.

16. Cutting insert according to claim 11, wherein the enlarged ridge and groove, respectively, are enlarged by being at least wider than the plurality of ridges and the grooves in said spaced-apart fields.

17. Part to cutting tool, comprising a serration connecting surface serving as an insert seat, which serration connecting surface comprises a plurality of ridges spaced-apart by grooves, wherein, in the serration connecting surface, at least one of an enlarged ridge and an enlarged groove is arranged between two spaced-apart fields,
   wherein the two spaced-apart fields each comprises a plurality of ridges of a second size, the second size being different than a size of the at least one of the enlarged ridge and the enlarged groove,
   wherein the at least one of the enlarged ridge and enlarged groove is oriented parallel with the plurality of ridges in the two spaced-apart fields, wherein the serration connecting surface serving as an insert seat is positioned on the cutting tool to mate with on a bottom side opposite a top side and adjacent a clearance surface of a cutting insert, and wherein the cutting edge of the cutting insert is the edge where the top side and clearance surface intersect.

18. Tool part according to claim 17, intended for the receipt of rhombic cutting inserts having two diametrically opposed tips, wherein the enlarged groove extends from an acute portion of the serration connecting surface and separates the two spaced-apart fields having the plurality of ridges.

19. Tool part according to claim 17, wherein the plurality of ridges in at least one of the two spaced-apart fields are oriented parallel to each other and to the at least one of the enlarged ridge and enlarged groove.

20. Tool part according to claim 19, wherein the plurality of ridges in both of the two spaced-apart fields are oriented parallel to each other and to the at least one of the enlarged ridge and enlarged groove.

21. Tool part according to claim 17, including more than one enlarged ridge or more than one enlarged groove.

* * * * *